June 6, 1939.     J. J. CLARK     2,161,698
MOTOR VEHICLE AERIAL
Filed April 4, 1938
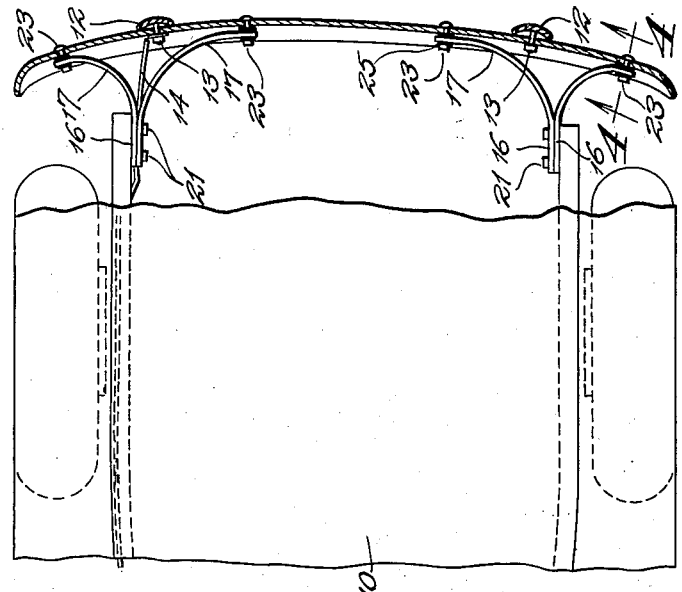
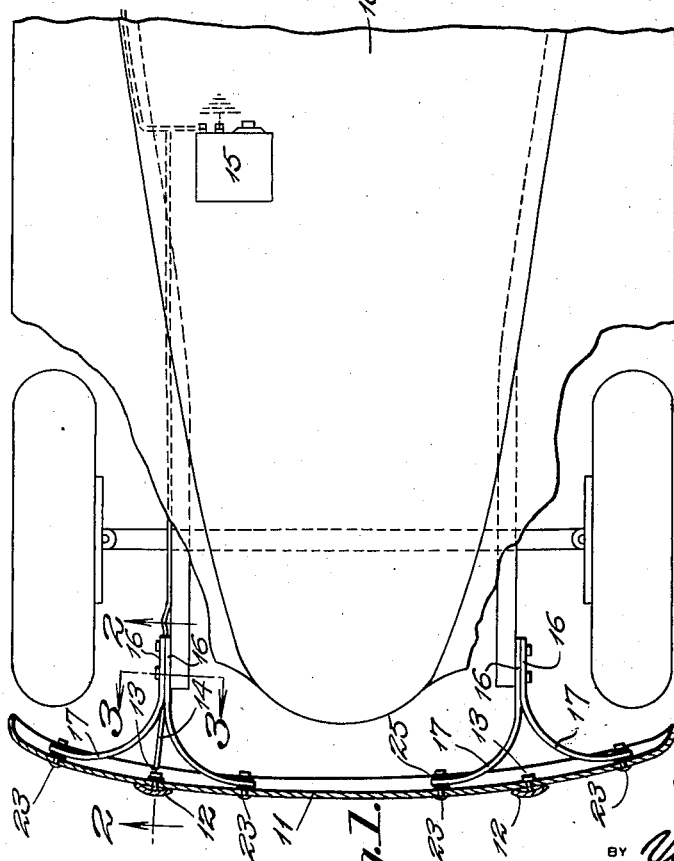
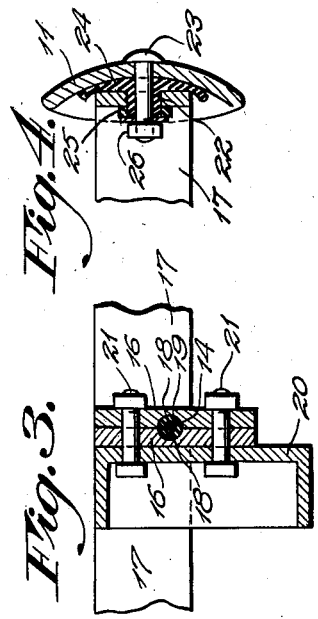
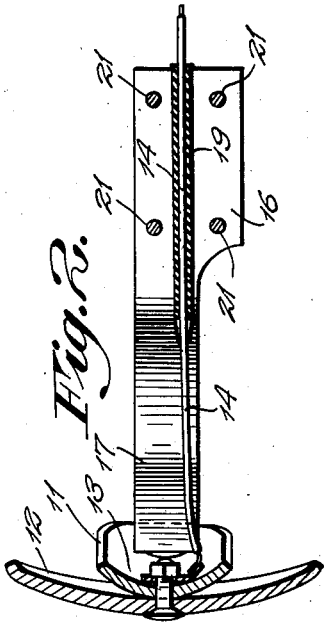
John J. Clark
INVENTOR
BY Victor J. Evans & Co.
ATTORNEYS
WITNESS Patented June 6, 1939

2,161,698

UNITED STATES PATENT OFFICE 2,161,698

MOTOR VEHICLE AERIAL

John J. Clark, Flint, Mich.

Application April 4, 1938, Serial No. 200,033

2 Claims. (Cl. 250—33)

This invention relates to motor vehicle aerials and has for an object to provide an aerial in which the conventional bumpers of an automobile form the aerial proper.

A further object is to provide an aerial including a bumper, bumper carrying brackets comprising two similar parts insulated from the bumper and provided with a longitudinal passage for housing a lead-in wire connected to the bumper, the lead-in wire thus being protected from injury at the exposed parts thereof.

A further object is to provide a motor vehicle aerial which will be formed of a few strong simple and durable parts, which will be inexpensive to manufacture and install, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of the motor vehicle with bumpers, bumper carrying brackets insulated from the bumpers, and connection for a lead-in wire with the bumpers, in accordance with the invention.

Figure 2 is a longitudinal sectional view taken on the line 2—2 of Figure 1 and showing the lead-in wire connected to the bolt which secures the bumper guard to the bumper and showing the lead-in wire engaged in a groove in one of the similar members of the bumper carrying bracket.

Figure 3 is a cross sectional view taken on the line 3—3 of Figure 1 and showing the lead-in wire clamped between the two similar members of one of the bumper carrying brackets.

Figure 4 is a cross sectional view taken on the line 4—4 of Figure 1 showing the bumper insulated from the bumper carrying bracket.

Referring now to the drawing in which like characters of reference designate similar parts in the various views, 10 designates a conventional automobile having front and rear bumpers 11 which are of the conventional type provided with vertically extending guards 12 which are anchored to the bumpers by bolts 13. In carrying out the invention the lead-in wire 14 for the receiving set 15 is connected to any one of the guard securing bolts 13 of the front and rear bumper or both or the lead-in may be connected to all of the bolts 13, to utilize the bumpers as an aerial.

In further carrying out the invention I provide novel bumper carrying brackets each comprising two similar parts. Each bracket part consists of a flat elongated member 16 having its outer end portion 17 reduced and curved laterally. The bracket members 16 are provided on their inner contact faces with grooves 18, best shown in Figure 3, which form a longitudinal passage through the bracket to house the lead-in wire 14 and an insulating tube 19 which insulates the lead-in wire from the bracket. The two similar members 16 of each bracket are bolted together and bolted to the chassis 20 by bolts 21.

The bumpers 11 are insulated from the bumper carrying brackets and for this purpose, as best shown in Figure 4, insulating bushings 22 are sleeved on the bolts 23 which secure the bumpers to the ends 17 of the bracket members. The bushing is provided at one end with an integral head 24 of insulating material which is confined between the bumper 11 and the end 17 of the bracket member. An insulating washer 25 is sleeved on the bushing and confined between the nut 26 of the securing bolt 23 and the end 17 of the bracket member.

The lead-in wires 14 may if desired be connected to the bolts 23 which secure the bumpers to the bumper carrying brackets since these bolts are insulated from the chassis and are in good electrical contact with the bumpers.

From the above description it is thought that the construction and operation of the invention is fully understood without further explanation.

What is claimed is:

1. An aerial for motor vehicles comprising a bumper, means for attaching a lead-in wire in good electrical contact with the bumper, and bumper carrying brackets each comprising two similar parts, each part consisting of a flat elongated member having its outer end curved laterally and connected to the bumped, the flat elongated members being secured together side by side for attachment to the vehicle and provided on their inner contact faces with grooves forming a longitudinal passage through which a lead-in wire may be trained.

2. An aerial for motor vehicles comprising a bumper, means for attaching a lead-in wire in good electrical contact with the bumper, bumper carrying brackets each comprising two similar parts, each part consisting of a flat elongated member having its outer end turned laterally and connected to the bumper, the flat elongated members being secured together side by side for attachment to the vehicle and provided on their inner contact faces with grooves forming a longitudinal passage, a lead-in wire in said passage connected to the bumper, and an insulating tube in said passage adapted to insulate the lead-in wire from the bumper carrying bracket members.

JOHN J. CLARK.